US010352336B2

(12) United States Patent
Wilmot et al.

(10) Patent No.: US 10,352,336 B2
(45) Date of Patent: Jul. 16, 2019

(54) VENTED LINEAR ACTUATOR

(71) Applicant: JOYSON SAFETY SYSTEMS ACQUISITION LLC, Auburn Hills, MI (US)

(72) Inventors: Larry Wilmot, Oxford, MI (US); Rachid Hammoud, Windsor (CA)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 27 days.

(21) Appl. No.: 15/694,270

(22) Filed: Sep. 1, 2017

(65) Prior Publication Data

US 2018/0058481 A1 Mar. 1, 2018

Related U.S. Application Data

(60) Provisional application No. 62/382,685, filed on Sep. 1, 2016, provisional application No. 62/393,397, filed on Sep. 12, 2016.

(51) Int. Cl.
*F15B 15/19* (2006.01)
*F15B 21/044* (2019.01)
(Continued)

(52) U.S. Cl.
CPC ............ *F15B 15/19* (2013.01); *F15B 21/044* (2013.01); *B60R 21/38* (2013.01); *F15B 15/149* (2013.01); *F15B 15/1457* (2013.01)

(58) Field of Classification Search
CPC ...... F15B 15/19; F15B 21/044; F15B 15/149; F15B 15/1457; B60R 21/38
(Continued)

(56) References Cited

U.S. PATENT DOCUMENTS 2,926,638 A * 3/1960 Magnus .................... B64C 1/32
60/506
3,054,032 A * 9/1962 Sabins .................. H01L 23/467
165/47
(Continued)

FOREIGN PATENT DOCUMENTS

DE 102011106514 12/2012
EP 1495918 8/2006
(Continued)

OTHER PUBLICATIONS

International Search Report and Written Opinion, dated Dec. 13, 2017, in connection with International Application No. PCT/US2017/049916.

*Primary Examiner* — Hoang M Nguyen
(74) *Attorney, Agent, or Firm* — Meunier Carlin & Curfman LLC

(57) ABSTRACT

Various implementations include a linear actuator that provides controllable depressurization of the actuator and is tunable to the specifications set by the vehicle manufacturer. The linear actuator includes a housing and a piston and piston rod that are slidably disposed within a channel extending through the housing. The piston rod defines a vent path that includes an axial cavity adjacent the proximal end of the piston rod and radial channel extending from the axial cavity to an outer peripheral surface of the piston rod. Pressurized gas entering the housing causes the piston to move axially through the housing, and a portion of the gas vents through the cavity and radial channel to the channel of the housing and then to the environment. This venting allows the actuator to be returned to its initial or stored position within a time frame and without exceeding the force set by the manufacturer.

20 Claims, 8 Drawing Sheets

(51) Int. Cl.
  *B60R 21/38* (2011.01)
  *F15B 15/14* (2006.01)
(58) Field of Classification Search
  USPC .................................................. 60/632–638
  See application file for complete search history.

(56) References Cited

U.S. PATENT DOCUMENTS

| | | | | |
|---|---|---|---|---|
| 3,180,082 | A * | 4/1965 | Benditt | F15B 15/19 60/638 |
| 3,643,329 | A * | 2/1972 | Lieberman | B23D 15/145 30/180 |
| 8,739,682 | B2 | 6/2014 | Dreyer et al. | |
| 9,206,089 | B2 | 12/2015 | Inuzuka | |
| 2004/0211313 | A1 | 10/2004 | Yamaguchi | |
| 2005/0035608 | A1 | 2/2005 | Larsen et al. | |
| 2007/0222198 | A1 | 9/2007 | Parks et al. | |
| 2012/0204562 | A1 | 8/2012 | Schafer et al. | |
| 2015/0075402 | A1 | 3/2015 | Henck | |

FOREIGN PATENT DOCUMENTS

| | | |
|---|---|---|
| EP | 1615808 | 6/2009 |
| EP | 1615809 | 3/2010 |
| EP | 1948485 | 4/2012 |
| JP | 2000033850 | 2/2002 |
| WO | 2014096943 | 6/2014 |
| WO | 2014197900 | 12/2014 |
| WO | 2015048800 | 4/2015 |

\* cited by examiner

VENTED LINEAR ACTUATOR

CROSS REFERENCE TO RELATED APPLICATIONS

This application claims priority to U.S. Patent Application No. 62/393,397, entitled "Vented Linear Actuator," and filed Sep. 12, 2016, and to U.S. Patent Application No. 62/382,685, entitled "Vented Linear Actuator," and filed Sep. 1, 2016, the contents of which are herein incorporated by reference in their entireties.

BACKGROUND

Pyrotechnic linear actuators may be used to move surfaces on or portions of a vehicle to protect a pedestrian in the event of impact with the vehicle. For example, linear actuators may be disposed below a portion of the hood to lift the hood of the vehicle to a defined stroke (distance) within a certain time frame in the event of a pedestrian impact. The vehicle manufacturer may set specifications as to the defined stroke and time frame, as well as a de-pressurization time frame and/or maximum force target for returning the vehicle part moved by the linear actuator to its pre-deployed position (e.g., within 2 seconds or using less than 200 Newtons). The de-pressurization time frame and/or force targets can be challenging or impossible to achieve with a post deployed actuator that is retaining gas pressure.

Thus, there is a need in the art for an improved actuator that is tunable to the vehicle manufacturer's specifications.

BRIEF SUMMARY

Various implementations include a linear actuator that includes a piston coupled to a piston rod and a housing. The piston includes a proximal end surface and a distal end surface, and the piston rod includes a distal end surface, a proximal end, and an outer peripheral surface extending between the distal end surface and the proximal end. The proximal end of the piston rod is coupled to the distal end surface of the piston. The proximal end surface of the piston defines an opening, and the piston rod defines a cavity having an inner wall. The opening and the cavity are in fluid communication with each other. The cavity extends axially from the proximal end of the piston rod through at least a portion of the piston rod. The housing has a proximal end, a distal end, and a channel extending between the proximal end and the distal end of the housing. The channel is defined by an inner wall of the housing, and the distal end of the housing defines an axial opening to the channel. The piston and piston rod are slidably disposed within the channel of the housing, and the outer peripheral surface of the piston rod and the inner wall of the channel of the housing define a space therebetween. The piston rod further defines at least one radial channel that extends radially between the inner wall of the cavity and the outer peripheral surface of the piston rod. The radial channel is in fluid communication with the cavity of the piston rod, the opening of the piston, the channel of the housing, and the axial opening to the channel of the housing during at least a portion of an upward stroke of the piston rod through the channel.

In some implementations, the piston further comprises a seal disposed around an outer peripheral surface of the piston, which extends between the proximal and distal end surfaces of the piston. The seal is disposed axially between the proximal end surface and the distal end surface of the piston. The seal has an outer peripheral surface abutting the inner wall of the housing to prevent fluid flow past the seal through the channel of the housing. In some implementations, the seal comprises a resiliently deformable material that is compressible between the inner wall of the housing and the outer peripheral wall of the piston.

In some implementations, the outer peripheral surface of the piston defines a circumferential groove, and the seal is disposed within the circumferential groove.

In some implementations, the outer peripheral surface of the piston has a first outer diameter, and the outer peripheral surface of the piston rod has a second outer diameter. The first outer diameter is greater than the second outer diameter.

In some implementations, the linear actuator further includes a gas generator having an outlet. The outlet is coupled to the proximal end of the housing, wherein pressurized gas from the gas generator flows through the outlet into the proximal end of the housing, the opening of the piston, and the cavity of the piston rod, and through the radial channel of the piston rod into the channel of the housing and axially between the seal and the axial opening to the channel and through the axial opening to the environment.

In some implementations, the radial channel has a circular cross-section as viewed through a plane that is parallel to a longitudinal axis of the piston rod and orthogonal to a longitudinal axis of the radial channel. In some implementations, a diameter of the radial channel is between 0.25 mm and 3 mm.

In some implementations, the at least one radial channel comprises a first radial channel and a second radial channel. In some implementations, the first and second radial channels are diametrically opposed.

In some implementations, a striker is coupled to the distal end surface of the piston rod.

In some implementations, the striker is threadingly coupled to the distal end surface of the piston rod. In other implementations, the striker is integrally formed with the distal end surface of the piston rod.

In some implementations, the cavity of the piston rod extends along a length of the piston rod, and the striker seals the distal end of the cavity of the piston rod to prevent fluid flow through the distal end of the cavity and the striker.

In some implementations, the cavity extends from the proximal end of the piston rod to a plane extending transversely to a longitudinal axis of the piston rod. The plane is spaced between the distal end surface of the piston rod and the radial channel of the piston rod.

In some implementations, the radial channel is in fluid communication with the cavity of the piston rod, the channel of the housing, and the axial opening to the channel of the housing during an initial portion of an upward stroke of the piston rod. The radial channel is in direct fluid communication with the cavity of the piston rod and an environment outside of the housing during a subsequent portion of the upward stroke.

In some implementations, the piston further defines a beveled surface extending from the opening defined by the proximal end surface of the piston. In some implementations, the beveled surface and the proximal end surface of the piston are at an angle of between 30° to 60° with respect to each other.

In some implementations, a distal end of the cavity is conically shaped, and in other implementations, the distal end of the cavity is flat.

BRIEF DESCRIPTION OF THE DRAWINGS

The device is explained in even greater detail in the following exemplary drawings. The drawings are merely exemplary to illustrate the structure of preferred devices and certain features that may be used singularly or in combination with other features. The invention should not be limited to the implementations shown.

DETAILED DESCRIPTION

Various implementations include a linear actuator that provides controllable depressurization of the actuator and is tunable to the specifications set by the vehicle manufacturer. For example, the actuator can be returned to its initial, or stored, position within a specified time frame and with the maximum force set by the manufacturer, according to some implementations. The stiffness of the actuator post deployment (at the top of the upward stroke) can be decreased to avoid injury to a pedestrian upon impact with a portion of the vehicle (e.g., the hood) moved by the actuator, according to some implementations. And, in various implementations, the rate of de-pressurization is tunable.

Figure 2:
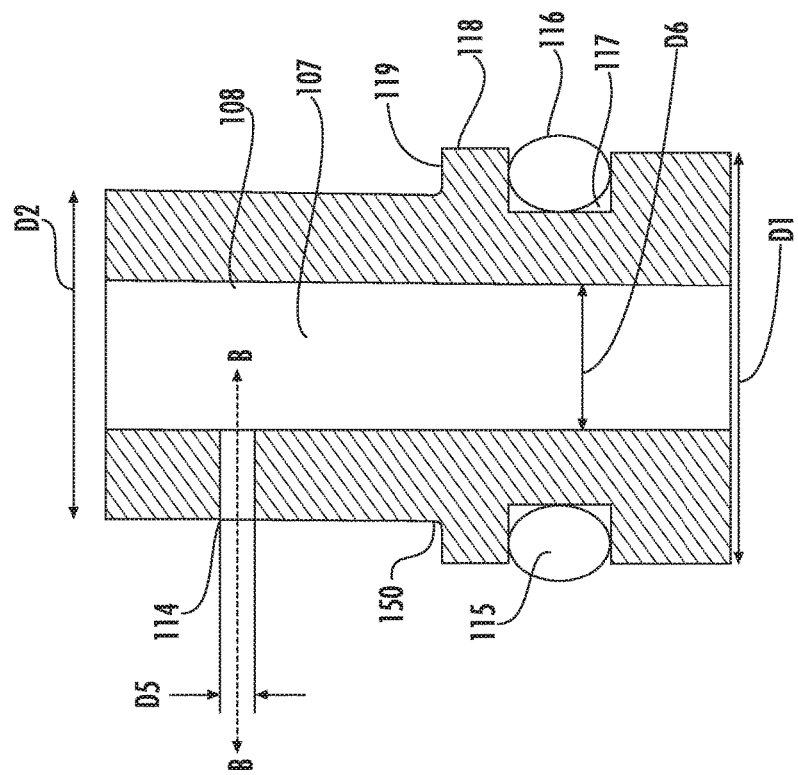
FIG. 2 illustrates a close up view of a portion of the linear actuator shown in FIG. 1.
Figure 1:
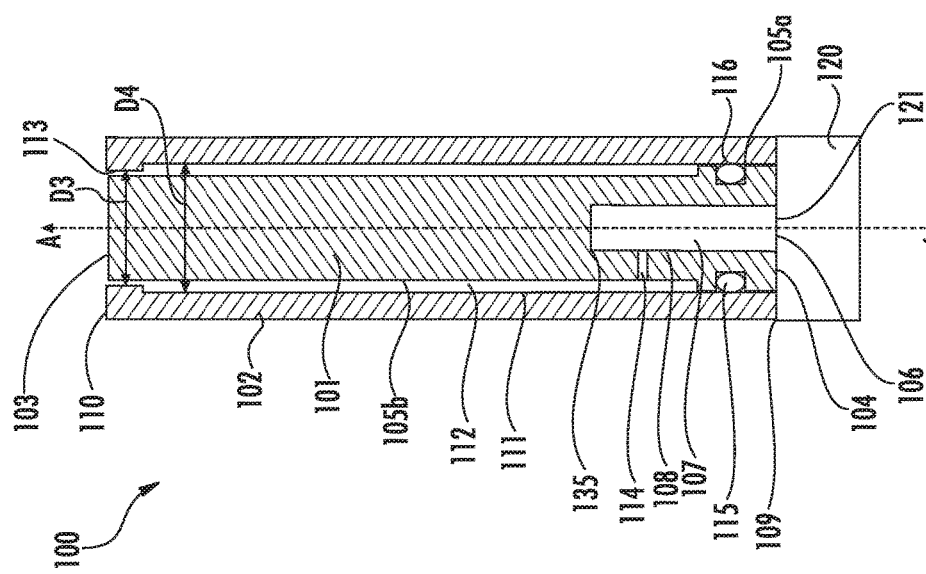
FIG. 1 illustrates a cross sectional view of a linear actuator according to one implementation.

FIGS. 1 and 2 illustrate an exemplary linear actuator according to one implementation. As shown in FIG. 1, the linear actuator 100 includes a piston 118 coupled to a piston rod 101 and a housing 102. The piston 118 includes a distal end surface 119, a proximal end surface 104, and an outer peripheral surface 105a that extends between the distal end surface 119 and the proximal end surface 104. The piston rod 101 includes a distal end surface 103, a proximal end 150, and an outer peripheral surface 105b that extends between the distal end surface 103 and the proximal end 150. The piston 118 defines an opening 106 that extends between the proximal end surface 104 and the distal end surface 119 of the piston 118, and an inner wall 108 of the piston rod 101 defines a cavity 107. The cavity 107 extends axially from the proximal end 150 of the piston rod 101 and is in fluid communication with the opening 106 defined by the piston 118.

The housing 102 has a proximal end 109, a distal end 110, and an inner wall 111. The inner wall 111 of the housing 102 defines a channel 112 extending between the proximal end 109 and the distal end 110. The distal end 110 of the housing 102 defines an axial opening 113 to the channel 112. The piston 118 and the piston rod 101 are slidably disposed within the channel 112 of the housing 102, and the outer peripheral surface 105b of the piston rod 101 and the inner wall 111 of the housing 102 define a space therebetween.

The piston rod 101 also defines at least one radial channel 114 that extends radially between the inner wall 108 of the cavity 107 of the piston rod 101 and the outer peripheral surface 105b of the piston rod 101. The radial channel 114 is in fluid communication with the cavity 107 of the piston rod 101, the opening 106 defined by the piston 118, the channel 112 of the housing 102, and the axial opening 113 to the channel 112 of the housing 102.

In the implementation shown in FIGS. 1 and 2, the radial channel 114 has a circular cross-section as viewed through a plane that is parallel to longitudinal axis A-A of the piston rod 101 and orthogonal to longitudinal axis B-B of the radial channel 114. In addition, a diameter D5 of the radial channel 114 is between 0.25 mm and 3 mm. However, in other implementations, the radial channel may have a non-circular cross-section.

In addition, the cavity 107 of the piston rod 101 extends from the proximal end 150 of the piston rod 101 to a plane that extends transversely (e.g., orthogonally) to the longitudinal axis A-A of the piston rod 101 and is spaced between the distal end surface 103 of the piston rod 101 and the radial channel 114 of the piston rod 101.

The piston 118 includes a seal 115 disposed around the outer peripheral surface 105a of the piston 118. The seal 115 is disposed axially between the proximal end surface 104 of the piston 118 and the distal end surface 119. The seal 115 has an outer peripheral surface 116 that abuts the inner wall 111 of the housing 102 to prevent fluid flow past the seal 115 through the channel 112 of the housing 102. In some implementations, the seal 115 is a resiliently deformable material, such as rubber or a polymer material, that is compressible between the piston 118 and the inner wall 111 of the housing 102. For example, the seal 115 may be a compressible O-ring or square ring.

In the implementation shown in FIGS. 1-2, the outer peripheral surface 105a of the piston 118 has a first outer diameter D1, and the outer peripheral surface 105b of the piston rod 101 has a second outer diameter D2. The first outer diameter D1 is greater than the second outer diameter D2. And, the axial opening 113 in the housing 102 has an inner diameter D3 that is greater than the second outer diameter D2 but less than first outer diameter D1 (i.e., D1>D3>D2). By having the second diameter D2 be less than the inner diameter D3 of the axial opening 113, the piston rod 101 is allowed to pass through the axial opening 113 during the upward stroke of the piston 118 and piston rod 101. However, by having the first diameter D1 of the piston 118 be greater than the inner diameter D3 of the axial opening 113, the piston 118 is prevented from exiting the housing 102 at the end of the upward stroke.

The outer peripheral surface 105a of the piston 118 defines a circumferential groove 117 that extends radially inwardly from the outer peripheral surface 105a, and the seal 115 is disposed within the circumferential groove 117. The groove 117 prevents the seal 115 from axial movement along the piston 118 during axial movement of the piston 118 through the housing 102.

In addition, in the implementations shown in FIGS. 1-4, the piston 118 and the piston rod 101 are integrally formed. However, in other implementations, the piston 118 and the piston rod 101 may be separately formed and coupled together.

A striker surface of the piston rod 101 is integrally formed and coextensive with the distal end surface 103 shown in FIG. 1. However, in other implementations, the striker surface may extend radially outwardly relative to the outer peripheral surface 105b adjacent the distal end surface 103. In other implementations, such as the implementation described below in relation to FIG. 4, the striker surface may be separately formed from the piston rod and coupled thereto.

A gas generator 120 (e.g., an initiator or micro gas generator (MGG)) has an outlet 121 that is coupled to the proximal end 109 of the housing 102. When the gas generator is initiated, pressurized gas flows from the outlet 121 of the gas generator 120 and into the proximal end 109 of the housing 102 and the opening 106 of the piston 118 and the cavity 107 of the piston rod 101. The pressurized gas causes the piston 118 and piston rod 101 to move from an initial or stored position to a deployed position. FIG. 1 illustrates the piston 118 and piston rod 101 in the stored, or initial, position in which the proximal end surface 104 of the piston 118 is adjacent the proximal end 109 of the housing 102. After initiation of the gas generator, the proximal end surface 104 of the piston 118 moves axially away from the proximal end 109 of the housing 102 toward the distal end 110 of the housing 102. The pressurized gas creates a higher pressure volume in the cavity 107 and the portion of the channel 112 between the seal 115 and the proximal end surface 104 of the piston 118, and a lower pressure volume exists in the portion of the channel 112 between the seal 115 and the axial opening 113 of the housing 102.

Figure 9:
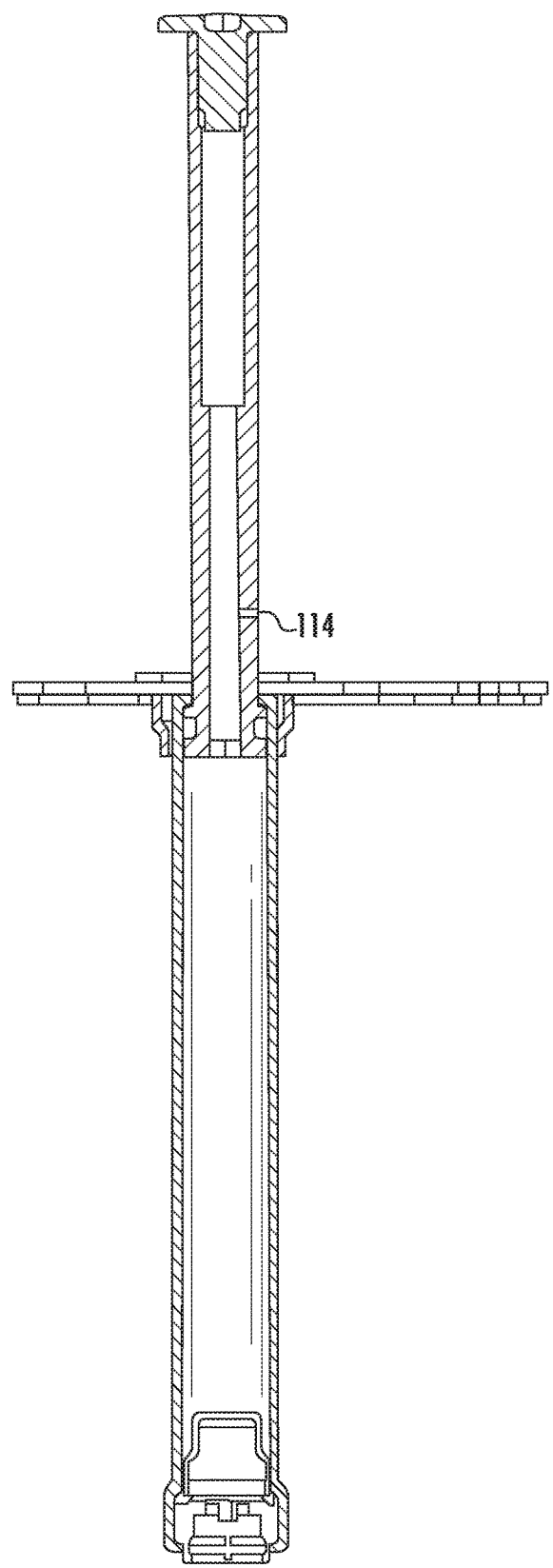
FIG. 9 illustrates a piston and piston rod in the extended position according to one implementation.

During the initial part of the upward stroke of the piston 118 and the piston rod 101, a portion of the pressurized gas from the gas generator 120 flows from the cavity 107 of the piston rod 101, through the radial channel 114 of the piston rod 101 into the channel 112 of the housing 102, axially between the seal 115 and the axial opening 113 to the channel 112, and through the axial opening 113 to the environment. And, after the radial channel 114 moves axially past the opening 113, the pressurized gas flows directly from the cavity 107 through the radial channel 114 to the environment, as shown in FIG. 9. The venting of the pressurized gas through the cavity 107 and radial channel 114 to the environment allows a sufficient amount of gas to escape the higher pressure side of the piston rod after initiation of the gas generator so that the piston 118 and the piston rod 101 can be returned to its initial position after deployment using a force of less than 200 Newtons, for example. However, the amount of gas that is allowed to escape is tunable by adjusting the volume of the radial channel 114, the volume of the cavity 107, and/or the distance of the center of the radial channel 114 from the proximal end surface 104 of the piston 118. Thus, these dimensions may be selected to allow enough gas to escape to allow the piston 118 and the piston rod 101 to be moved back to the initial position post deployment within a certain time frame and/or with a force less than a maximum amount set by a manufacturer but maintain sufficient pressure during the upward stroke to allow the piston rod 101 to reach the deployed position.

The difference between the inner diameter D4 of the channel 112 of the housing 102 and the outer diameter D2 of the piston rod 101 may be increased or decreased to expand or reduce, respectively, the volume between the piston rod 101 and the inner wall 111 of the housing 102. In addition, the inner diameter D6 and/or length of the opening 106 and cavity 107 as measured from the proximal end surface 104 to a distal end 135 of cavity 107 may be varied to vary the volume within the cavity 107 and opening 106.

Figure 3:
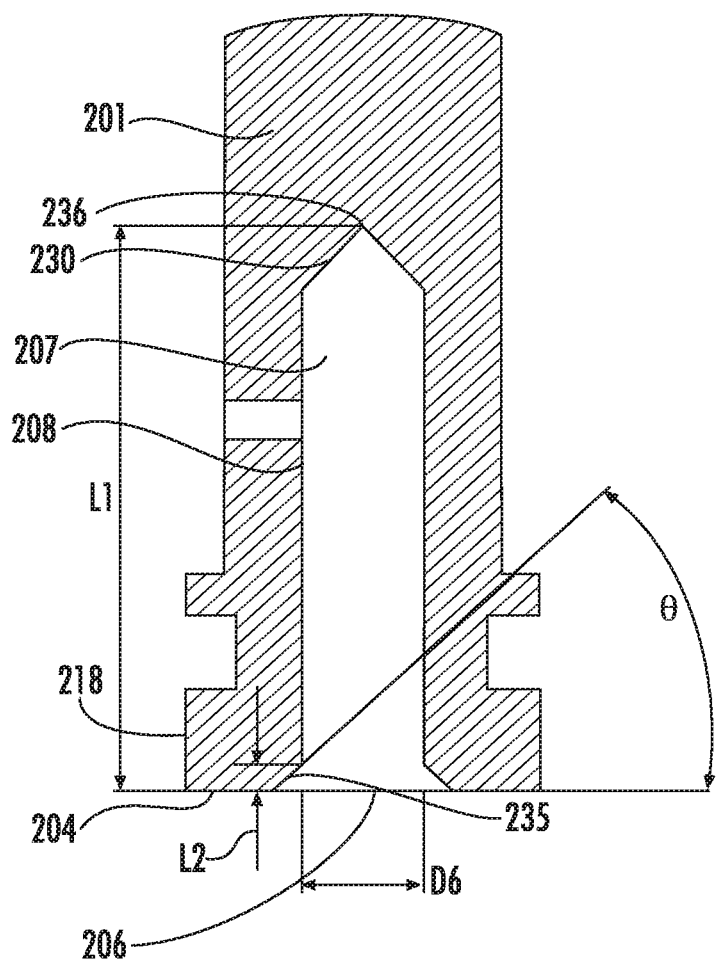
FIG. 3 illustrates a partial cross sectional view of a piston and piston rod according to another implementation.

The implementation of the piston 218 shown in FIG. 3 is similar to the piston 118 shown in FIGS. 1 and 2, but the opening 206 is partially defined by a beveled surface 235 extending from the proximal end surface 204 of the piston 218, and a distal end portion 230 of cavity 207 adjacent the distal end 236 of the cavity 207 is conically shaped. The angle θ of the beveled surface 235 relative to the proximal end surface 204 is between 30° and 60° (e.g., 45°). And, in the implementation shown, the distance L2 between the proximal end surface 204 and where the beveled surface 235 of the opening 206 ends is 0.25 mm. The diameter D6 of the cavity 207 is 5 mm, and the distance L1 between the proximal end surface 204 and a distal end 236 of the cavity 207 is 22 mm.

Figure 4:
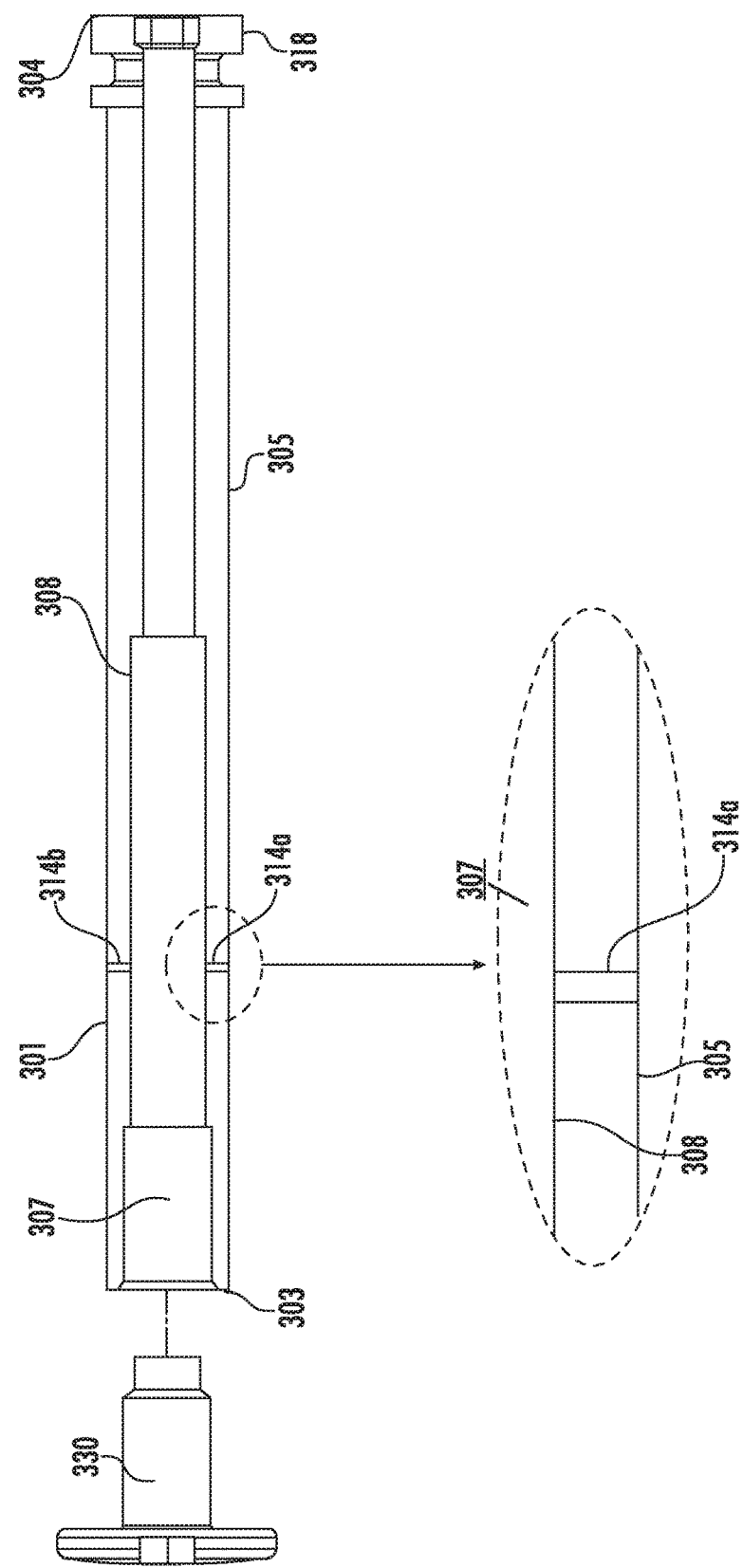
FIG. 4 illustrates a cross sectional view of a piston and piston rod according to another implementation.

In the implementation shown in FIG. 4, the piston rod 301 includes a first radial channel 314a and a second radial channel 314b. The first 314a and second radial channel 314b are diametrically opposed to each other. However, in other implementations, the piston rod may include one or more radial channels, and the radial channels may have the same or different cross sectional shapes, diameters, orientation of the longitudinal axis of each radial channel relative to the longitudinal axis of the piston rod, and axial positions along the piston rod.

The implementation shown in FIG. 4 also includes a piston rod 301 and a striker 330 that is formed separately from the piston rod 301. The striker 330 is threadingly coupled to the distal end 303 of the piston rod 301. Also, in this implementation, the cavity 307 of the piston rod 301 extends along a full length of the piston rod 301 and piston 318 (i.e., between the proximal end 304 of the piston 318 and the distal end 303 of the piston rod 301), and the striker 330 seals the distal end 303 of the cavity 307 of the piston rod 301 to prevent fluid flow through the distal end 303 of the cavity 307 and the striker 330. However, in other implementations, the cavity may extend only partially through the piston rod, such as is shown in the implementations shown in FIGS. 1 through 3.

Figure 5:
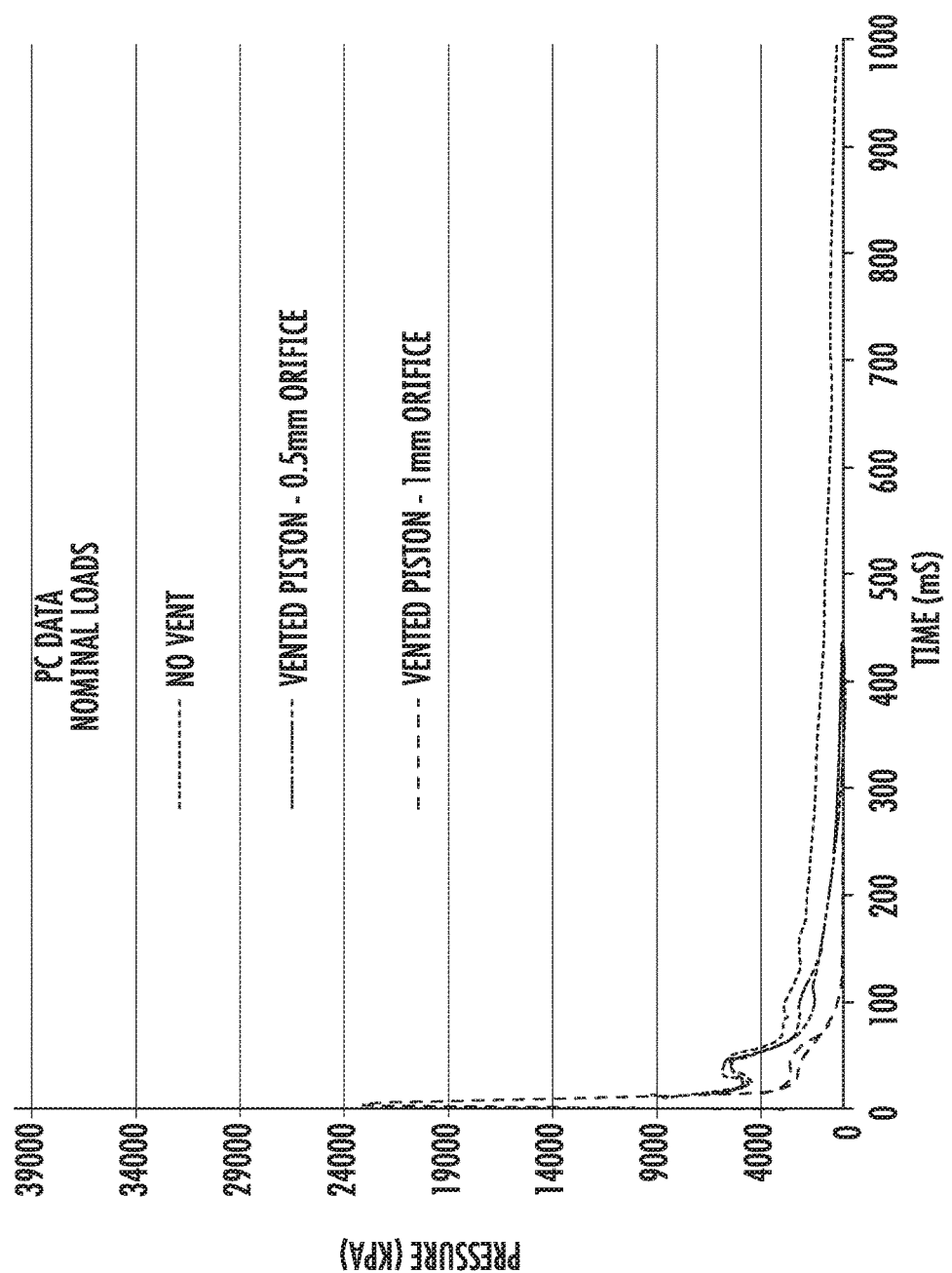
FIGS. 5 and 6 illustrate a chart showing the pressure in the linear actuator over time for a vented actuator having a 0.5 mm diameter radial channel, a vented actuator having a 1 mm diameter radial channel, and a non-vented actuator, according to one implementation.
Figure 6:
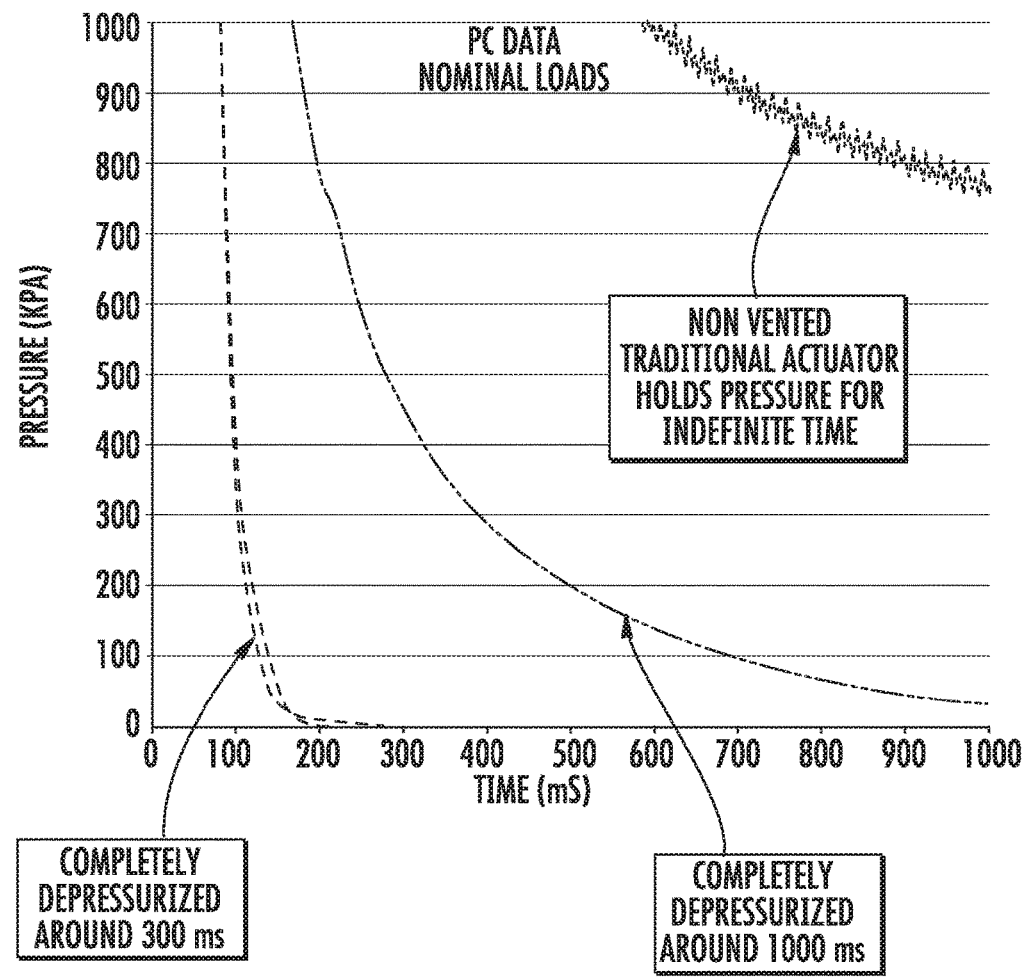

FIGS. 5 and 6 illustrate a chart showing a comparison of pressure in a housing of a linear actuator over time for a linear actuator having a piston rod with a 0.5 mm diameter radial channel, a piston rod having a 1 mm diameter radial channel, and a non-vented piston rod, according to one implementation. As shown, the linear actuator having the piston rod with a 1 mm diameter radial channel reached a maximum pressure at deployment that was slightly less than the maximum pressure reached by the other piston rods, and the time to de-pressurization was around 300 ms. The linear actuator having the piston rod with a 0.5 mm diameter radial channel was de-pressurized around 1000 ms. And, the linear actuator having the piston rod with no radial channel holds its pressure for an indefinite amount of time since the gas has no or little ability to escape the housing. Thus, the diameter (or volume) of the radial channel may be adjusted to control the amount of pressurized gas to be vented to the environment during and after deployment to achieve de-pressurization times and/or maximum force targets for resetting the actuator.

Figure 7:
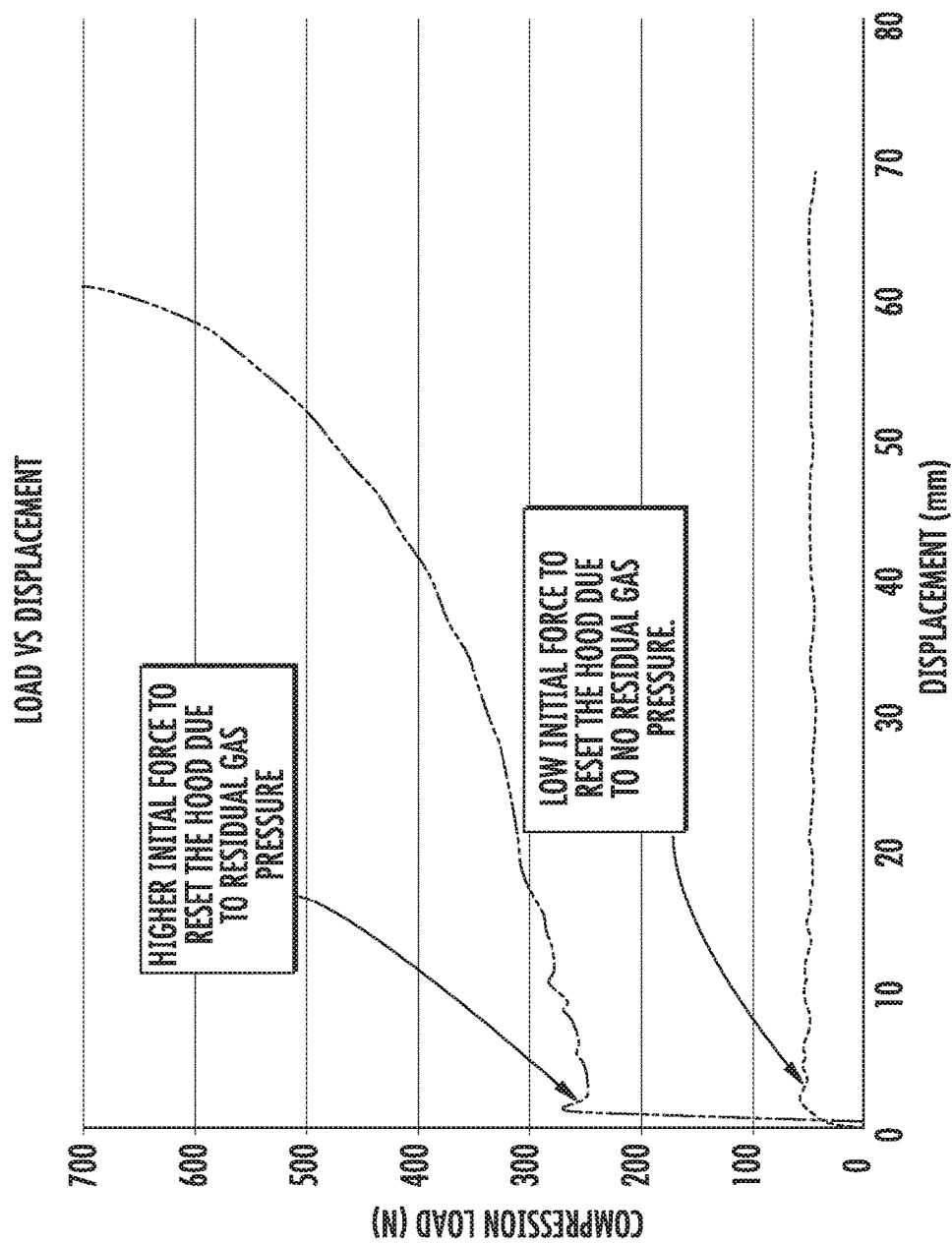
FIGS. 7 and 8 illustrate a chart showing the compression load versus the displacement of the piston for a vented actuator and a non-vented actuator, according to one implementation.
Figure 8:
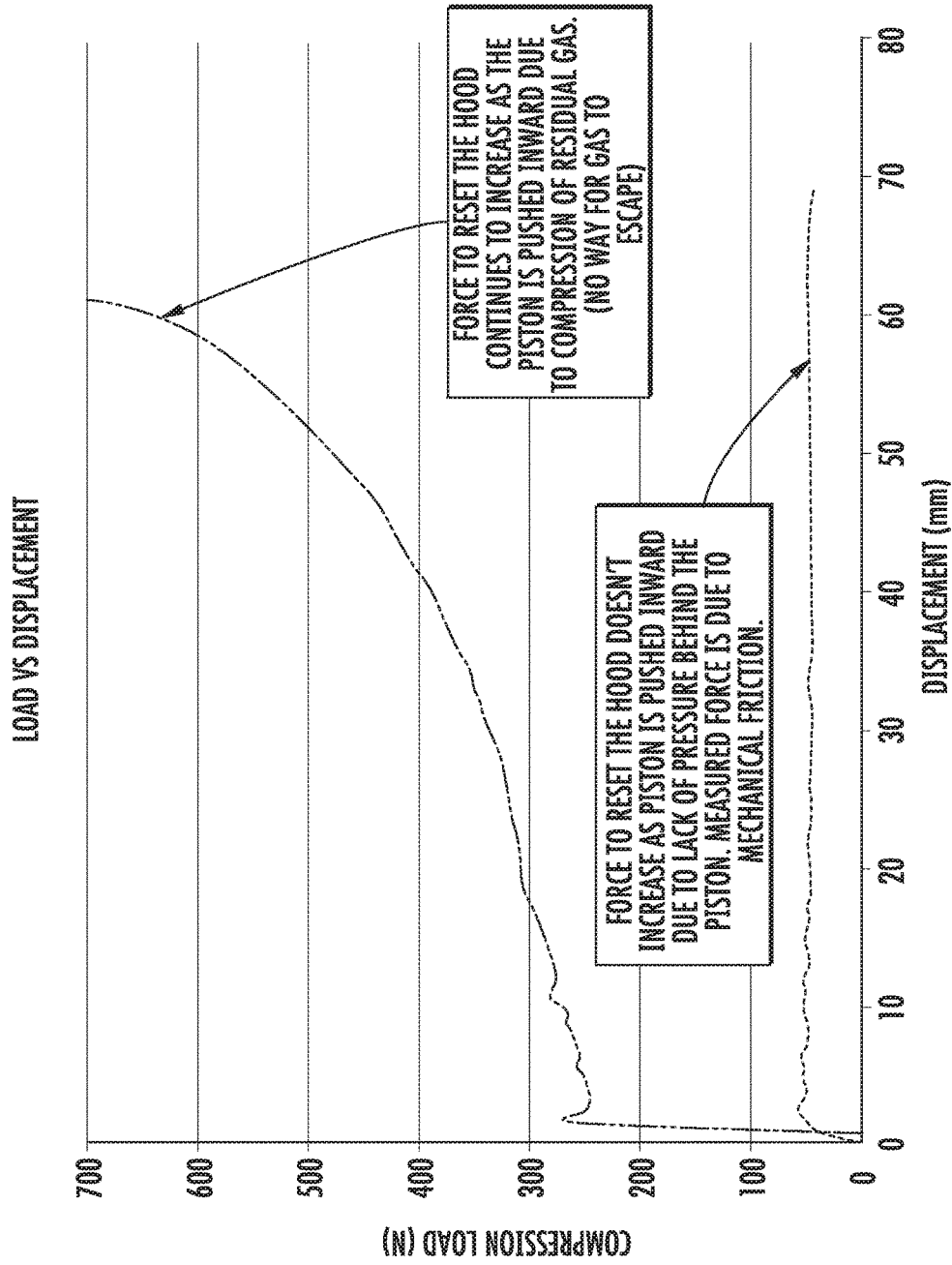

FIGS. 7 and 8 illustrate a chart showing the compression load versus the displacement of the piston for a piston rod having a radial channel and for a piston rod that does not have a radial channel, according to one implementation. The upper line represents the displacement of the piston without the radial channel, and the lower line represents the displacement of the piston having the radial channel. As shown in FIG. 7, the initial force to reset the hood (by returning the piston rod to its original position) is lower for the piston rod having the radial channel as compared to the piston rod without the radial channel. And, as shown in FIG. 8, the piston rod with the radial channel is able to be displaced a greater distance under the same load. However, the force to reset the hood having the piston rod without the radial channel continues to increase as the piston rod is pushed inwardly due to compression of residual gas since there is no where for the gas to escape.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

The invention claimed is:

1. A linear actuator comprising:
a piston comprising a piston rod, the piston rod comprising a distal end surface, a proximal end surface, and an outer peripheral surface extending between the distal end surface and the proximal end surface, wherein the proximal end surface of the piston rod defines an opening, and the piston rod defines a cavity having an inner wall, the cavity extending axially from the opening through a portion of the piston rod, and
a housing having a proximal end, a distal end, and a channel extending between the proximal end and the distal end, the channel defined by an inner wall of the housing, and the distal end of the housing defining an axial opening to the channel,
wherein:
the piston rod is slidably disposed within the channel of the housing, wherein the outer peripheral surface of the piston rod and the inner wall of the channel of the housing define a space therebetween, and
the piston rod further defines at least one radial channel that extends radially between the inner wall of the cavity and the outer peripheral surface of the piston rod, the radial channel being in fluid communication with the cavity of the piston rod, the channel of the housing, and the axial opening to the channel of the housing during at least a portion of an upward stroke of the piston rod through the channel.

2. The linear actuator of claim 1, wherein the piston rod further comprises a seal disposed around the outer peripheral surface of the piston rod, the seal being disposed axially between the proximal end surface of the piston rod and the radial channel, the seal having an outer peripheral surface abutting the inner wall of the housing to prevent fluid flow past the seal through the channel of the housing.

3. The linear actuator of claim 2, wherein the seal comprises a resiliently deformable material that is compressible between the inner wall of the housing and the outer peripheral wall of the piston rod.

4. The linear actuator of claim 2, wherein the outer peripheral surface of the piston rod defines a circumferential groove, and the seal is disposed within the circumferential groove.

5. The linear actuator of claim 4, wherein the outer peripheral surface of the piston rod comprises a first portion and a second portion, wherein the first portion is adjacent the proximal surface of the piston rod and has a first outer diameter, and the second portion is axially between the first portion and the distal surface of the piston rod and has a second outer diameter, wherein the first outer diameter is greater than the second outer diameter, and the circumferential groove is defined by the first portion.

6. The linear actuator of claim 2, further comprising a gas generator having an outlet, the outlet being coupled to the proximal end of the housing, wherein pressurized gas from the gas generator flows through the outlet into the proximal end of the housing and the cavity of the piston rod, through the radial channel of the piston rod into the channel of the housing and axially between the seal and the axial opening to the channel and through the axial opening to the environment.

7. The linear actuator of claim 1, wherein the radial channel has a circular cross-section as viewed through a plane that is parallel to a longitudinal axis of the piston rod and orthogonal to a longitudinal axis of the radial channel.

8. The linear actuator of claim 7, wherein a diameter of the radial channel is between 0.25 mm and 3 mm.

9. The linear actuator of claim 1, wherein the at least one radial channel comprises a first radial channel and a second radial channel.

10. The linear actuator of claim 9, wherein the first and second radial channels are diametrically opposed.

11. The linear actuator of claim 1, wherein the piston further comprises a striker, the striker being coupled to the distal end surface of the piston rod.

12. The linear actuator of claim 11, wherein the striker is threadingly coupled to the distal end surface of the piston rod.

13. The linear actuator of claim 12, wherein the cavity of the piston rod extends along a length of the piston rod, and the striker seals the distal end of the cavity of the piston rod to prevent fluid flow through the distal end of the cavity and the striker.

14. The linear actuator of claim 11, wherein the striker is integrally formed with the distal end surface of the piston rod.

15. The linear actuator of claim 1, wherein the cavity extends from the proximal end surface of the piston rod to a plane extending orthogonal to a longitudinal axis of the piston rod, the plane being spaced between the distal end surface of the piston rod and the radial channel of the piston rod.

16. The linear actuator of claim 1, wherein the radial channel is in fluid communication with the cavity of the piston rod, the channel of the housing, and the axial opening to the channel of the housing during an initial portion of an upward stroke of the piston rod, and the radial channel is in direct fluid communication with the cavity of the piston rod and an environment outside of the housing during a subsequent portion of the upward stroke.

17. The linear actuator of claim 1, wherein the piston further defines a beveled surface extending between the opening defined by the proximal end of the piston rod and the inner wall of the cavity.

18. The linear actuator of claim 17, wherein the beveled surface and the proximal end surface of the piston are at an angle of between 30° to 60° with respect to each other.

19. The linear actuator of claim 1, wherein a distal end of the cavity is conically shaped.

20. The linear actuator of claim 1, wherein a distal end of the cavity is flat.

* * * * *